United States Patent [19]
Nakata et al.

[11] 3,789,907
[45] Feb. 5, 1974

[54] MOLDING METHOD WITH SHIELDING MEMBER DRAWN AGAINST PARTICULATE MATERIAL

[75] Inventors: Kunii Nakata, Nagano City; Yoshimasa Kubo, Susaka City, both of Japan

[73] Assignees: Kabushiki Kaisha Akita; Kabushiki Kaisha Akita and Kunii Nakata, both of Susaka City, Japan

[22] Filed: Sept. 21, 1971

[21] Appl. No.: 182,476

[30] Foreign Application Priority Data
June 25, 1971 Japan.................................. 46/463

[52] U.S. Cl........................... 164/7, 164/23, 164/40
[51] Int. Cl............................................ B22c 15/22
[58] Field of Search....... 164/7, 253, 255, 364, 349, 164/23, 40

[56] References Cited
UNITED STATES PATENTS
3,229,338  1/1966  Kopera........................... 164/249 X
2,757,426  8/1956  Brennan............................... 164/23
3,556,196  1/1971  Buhler.............................. 164/40 X

FOREIGN PATENTS OR APPLICATIONS
925,073  3/1947  France................................ 164/349
1,239,814  7/1960  France................................ 164/349

Primary Examiner—Robert D. Baldwin
Attorney, Agent, or Firm—Stevens, Davis, Miller & Mosher

[57] ABSTRACT

A molding method comprising steps of bringing a shielding mold member into contact with the shaping surface of a shaping mold member to provide a mold assembly, filling a charge of a heat resisting particulate material in space disposed opposite the shaping mold member with respect to the shielding mold member, rendering negative the internal pressure of the space containing the charge so as to draw the shielding mold member toward the charge and cause the same to adhere thereto, removing the shaping mold member from the mold assembly so as to form a cavity defined by the shielding mold member, and pouring a molten metal into said cavity.

5 Claims, 27 Drawing Figures

PATENTED FEB 5 1974 3,789,907

MOLDING METHOD WITH SHIELDING MEMBER DRAWN AGAINST PARTICULATE MATERIAL

This invention relates to molding methods, and more particularly it is concerned with a method of molding wherein molding is carried out while the integrity of the mold used is maintained without relying on the rigidity of the mold itself.

In molding methods and apparatus of the prior art, the mold itself has a solid and tough structure so that the mold may be maintained in its original shape by its own rigidity. Because of this, production of the mold and removal of the molded article from the mold are a time consuming job and require a lot of manual attention.

Besides, conventional molding methods and apparatus require a variety of mold making devices which must be ready at hand at all times. Difficulty is faced with in storing them while not in service.

This invention has as its object the provision of a method of molding which provide improvements in conventional molding methods and apparatus and obviate the aforementioned disadvantages.

According to this invention, there is provided a molding method wherein at least one shielding mold member is brought into intimate contact with a surface of at least one pattern; heat resting particulate materials are filled in a space opposite the pattern with respect to the shielding mold member; pressure in the space containing said heat resisting particulate materials is rendered negative so as to draw the shielding mold member by suction toward said materials into intimate contact therewith; the pattern is removed from the mold assembly to form a cavity defined by the shielding mold member; and a molten metal is poured into the cavity to produce a molded article. This invention permits to carry out molding readily and quickly as required and to remove the molded article readily and quickly from the mold.

Additional objects as well as features of this invention become evident from the description set forth hereinafter when considered in conjunction with the accompanying drawings, in which.

Figure 1:
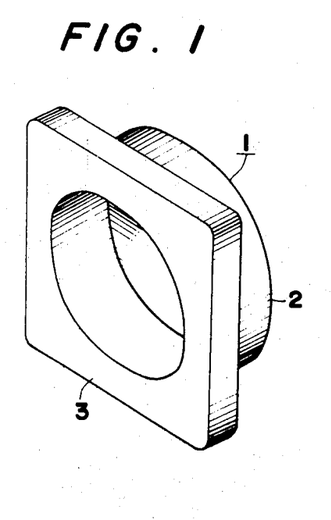
FIG. 1 is a perspective view of an article molded by the method and apparatus according to this invention.
Figure 2:
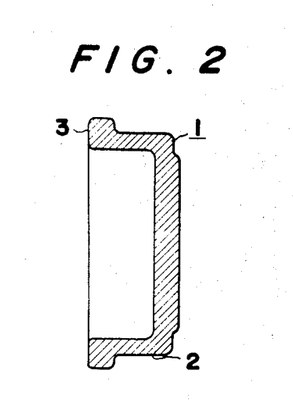
FIG. 2 is a central vertical sectional view of the article of FIG. 1.

One embodiment of this invention will be described with reference to FIG. 1 to FIG. 11. In FIGS. 1 and 2, 1 is a molded article including a flange 3 formed integrally with a bowl-shaped portion 2.

Figures 3, 4:
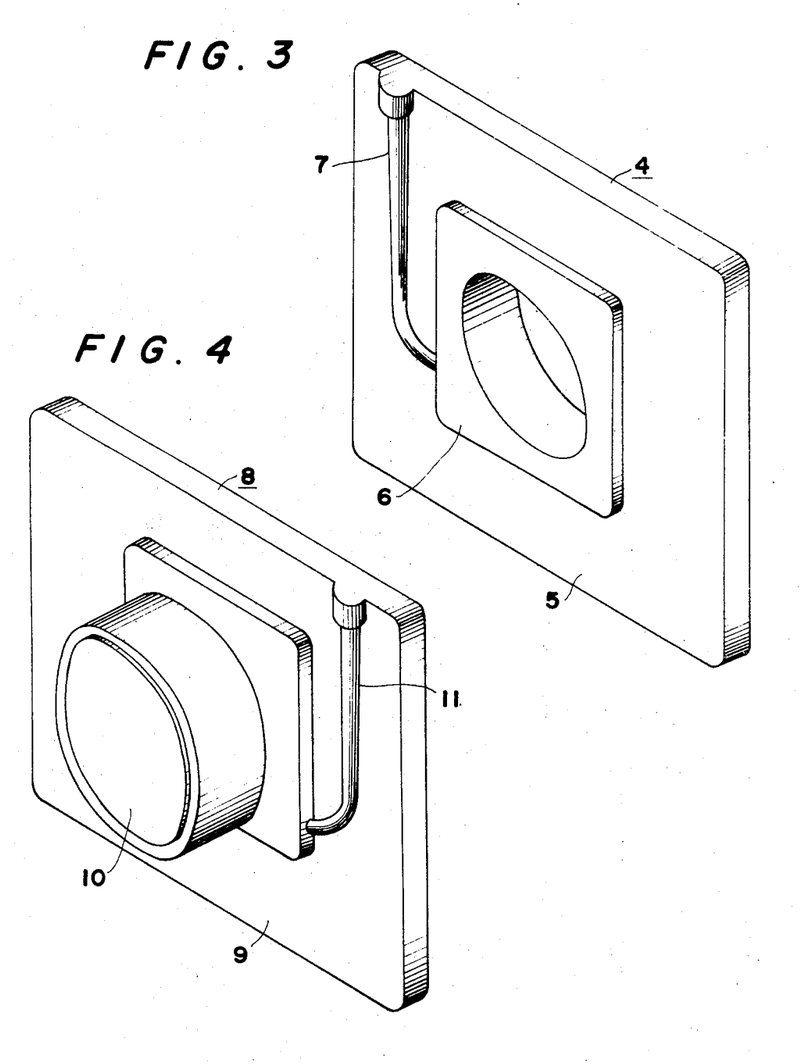
FIG. 3 is a perspective view of one of a pair of patterns comprising one embodiment of this invention.
FIG. 4 is a perspective view of the other pattern.

In FIG. 3, 4 is one of a pair of patterns made of wood, plaster of Paris, synthetic resin or metal and comprising a surface 6 formed on one side of a planar portion 5 of pattern 4 to conform in shape to the surface shape of one side of article 1. Pattern 4 is also formed on planar portion 5 thereof with a protuberance 7 connected to surface 6 for forming a molten metal passageway or sprue.

In FIG. 4, 8 is the other pattern made of wood, plaster of Paris, synthetic resin or metal and comprising a surface 10 formed on one side of a planar portion 9 of pattern 8 to conform in shape to the surface shape of the other side of article 1. Pattern 8 is also formed on planar portion 9 thereof with a protuberance 11 corresponding to the protuberance 7 on pattern 4 and connected to surface 10 for forming a molten metal passageway or sprue.

Figures 5, 6:
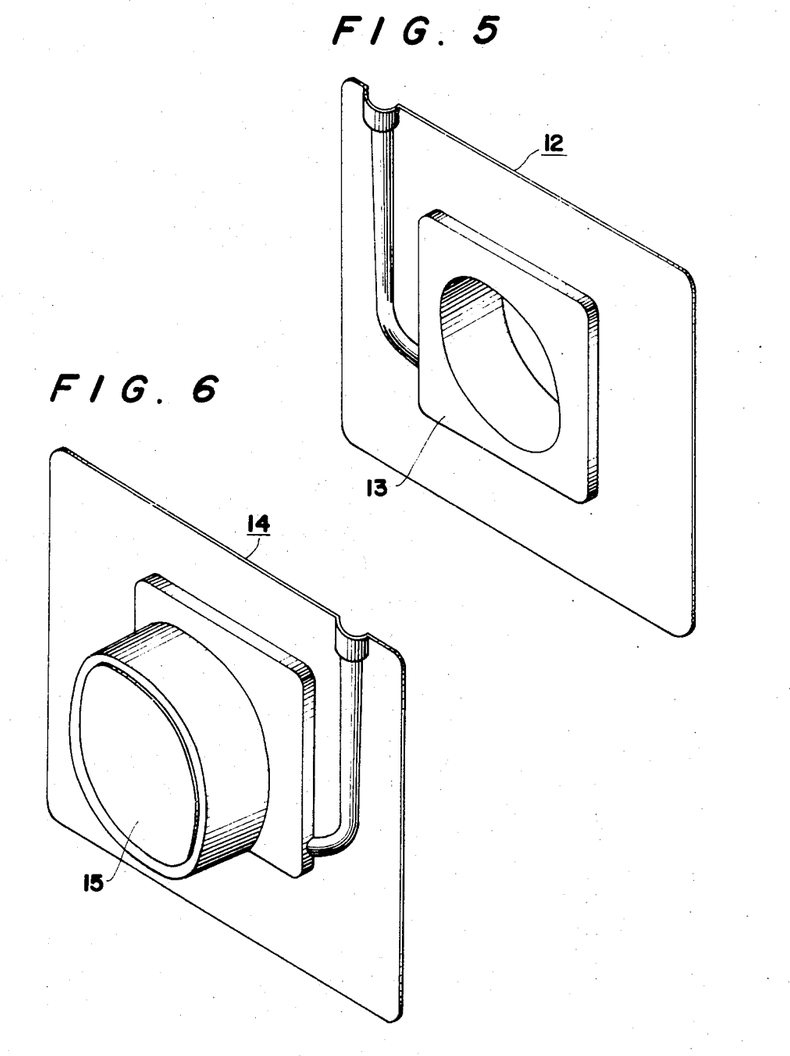
FIG. 5 is a perspective view of one of a pair of shierding mold members comprising one embodiment of this invention.
FIG. 6 is a perspective view of the other shielding mold member.

In FIG. 5, 12 is one of a pair of shielding mold members made, for example, of a film or sheet of synthetic resin of about 0.02 mm in thickness. Shielding mold member 12 is formed beforehand as by vacuum molding to have a shape 13 which conforms to the shaping surface 6 of pattern 4.

In FIG. 6, 14 is the other shielding mold member made, for example, of a film or sheet of synthetic resin of about 0.02 mm in thickness. Shielding mold member 14 is formed beforehand as by vacuum forming to have a shape 15 which conforms to the surface 10 of pattern 8.

Figure 7:
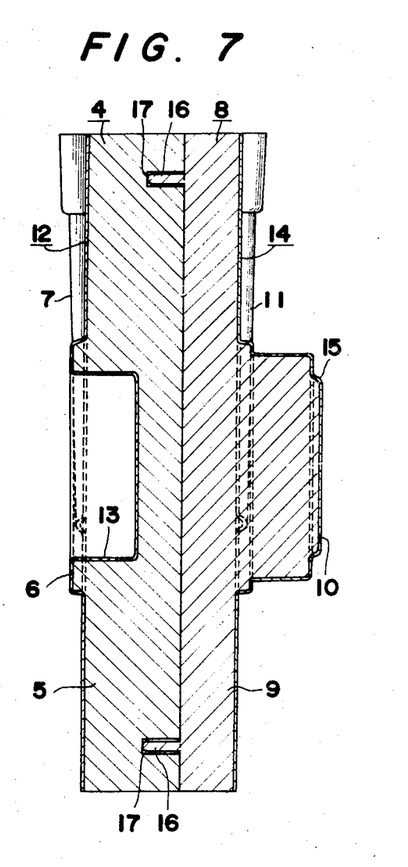
FIG. 7 is a central vertical sectional view of an assembly of patterns and shielding mold members of FIG. 3 to FIG. 6.
Figure 8:
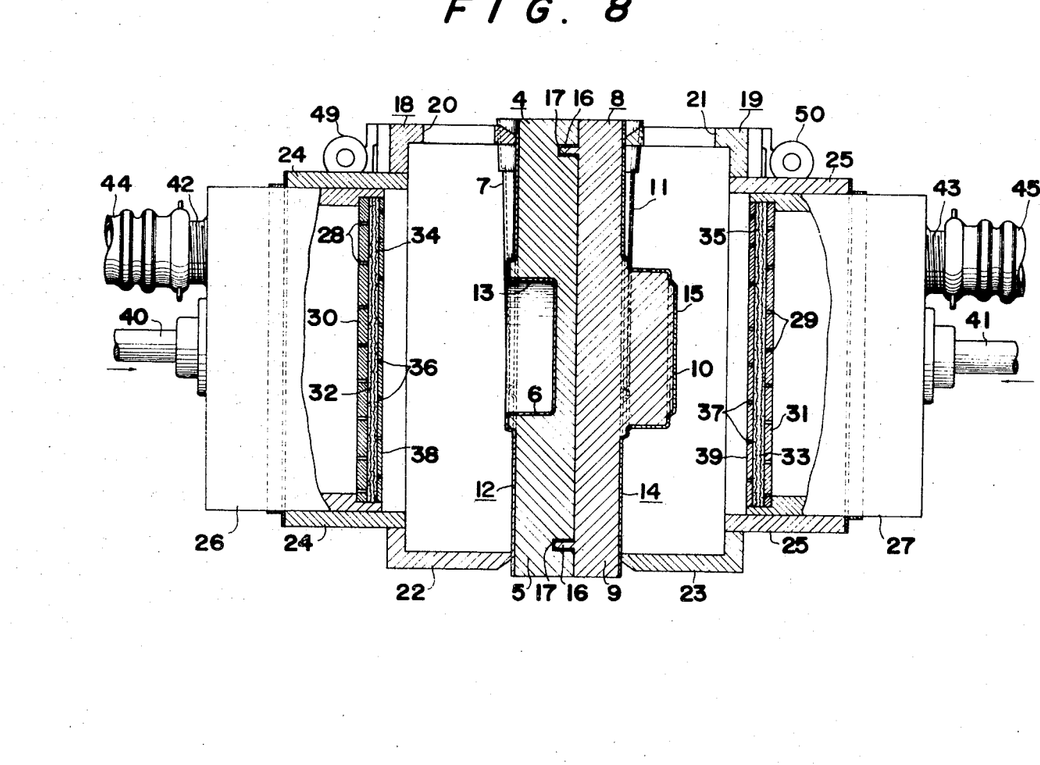
FIG. 8 is a central vertical sectional view of the mold assembly shown in FIG. 7 as it is held between a pair of flasks.

As shown in FIG. 7, two patterns 4 and 8 are juxtaposed to each other and their back surfaces are brought into contact with each other by inserting positioning pins 16 in positioning recesses 17 so as to correctly position patterns 4 and 8 relative to each other. Then one shielding mold member 12 is brought into intimate contact with the surface 6 of one pattern 4 while the other shielding mold member 14 is brought into intimate contact with the surface 10 of the other pattern 8. Then, a pair of flasks 18 and 19 is placed on opposite sides of the assembled shielding mold members and patterns as shown in FIG. 8, with flask 18 being disposed adjacent shielding mold member 12 and flask 19 adjacent shielding mold member 14 so as to hold the mold assembly therebetween.

Said shielding mold members 12 and 14 of film of a soft synthetic resinous material may be formed directly on the surfaces 6 and 10 of the patterns 4 and 8 respectively by vacuum forming without forming them beforehand.

Flasks 18 and 19 are formed in top plates thereof with material supply ports 20 and 21 respectively and include flask portions 22 and 23 respectively which are open at side walls and have guide cylinders 24 and 25 respectively which are secured to flask portions 22 and 23 to communicate with the openings formed in their side walls. Cylindrical presses 26 and 27 are reciprocably fitted in guide cylinders 24 and 25 respectively. A holding plate 30 formed therein with a multitude of ventilatory openings 28 is attached to an inner side of press 26 while a holding plate 31 formed therein with a multitude of ventilatory openings 29 is attached to an inner side of press 27. A filter 32 or screen of relatively large opening, filter 34 or screen of relatively small opening and pressing plate 38 formed therein with a multitude of ventilatory openings 36 are attached in the indicated order to an inner side of holding plate 30 while a filter 33 or screen of relatively large opening, filter 35 or screen of relatively small opening and pressing plate 39 formed therein with a multitude of ventilatory openings 37 are attached in the indicated order to an inner side of holding plate 31.

Plungers 40 and 41 of hydraulic cylinders, for example, are secured to presses 26 and 27 respectively at their outer side, and air vents 42 and 43 communicating with the interior of presses 26 and 27 are formed in the outer side of presses 26 and 27 respectively and connected, through lines 44 and 45 respectively, to air suction means (not shown).

Figure 9:
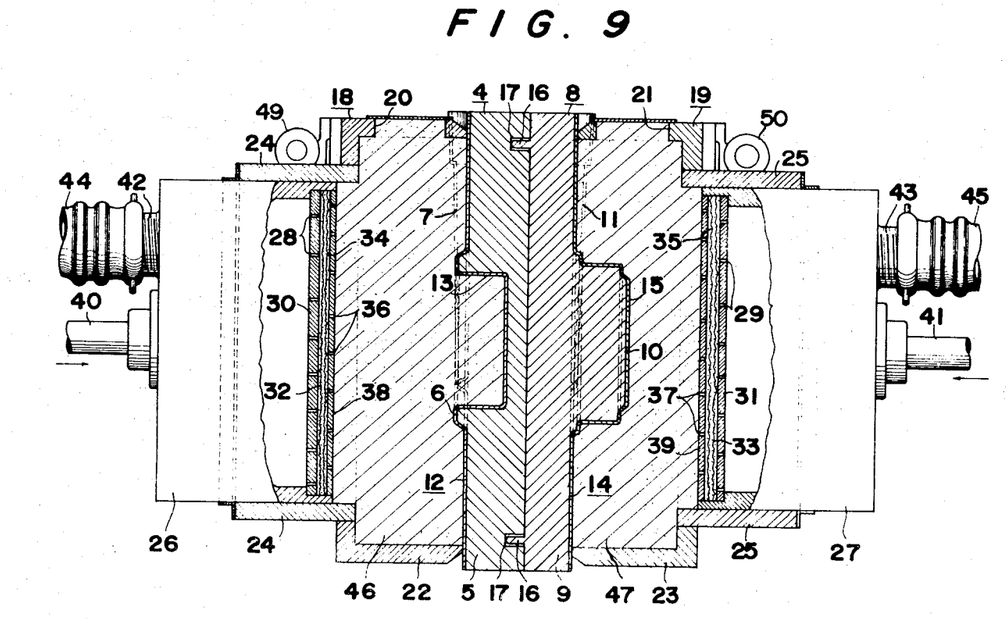
FIG. 9 is a central vertical sectional view of the mold assembly of FIG. 8 with the pair of flasks being each filled with a material.

Heat resisting particulate materials 46 and 47 such as known molding sand, are filled in flask portions 22 and 23 in a state shown in FIG. 8 through supply ports 20 and 21 respectively, so that the flask portions are filled with the materials as shown in FIG. 9.

Then, pressure is applied to plungers 40 and 41 to move the same forwardly so as to cause the pressing plates 38 and 39 of presses 26 and 27 to press materials 46 and 47 in flask portions 22 and 23 against patterns 4 and 8 through shielding mold members 12 and 14 respectively.

In this state, the interior of presses 26 and 27 is evacuated through lines 44 and 45 connected to air vents 42 and 43 respectively while material supply ports 20 and 21 of flask portions 22 and 23 respectively are closed. As a result, flask portions 22 and 23 are also evacuated through ventilatory ports 28 and 29 formed in holding plates 30 and 31, filters 34 and 35, and ventilatory ports 36 and 37 formed in pressing plates 38 and 39 respectively. This results in the pressure in the interior of flask portions 22 and 23 becoming negative, so that shielding mold members 12 and 14 are drawn by suction toward flask portions into pressing engagement with materials 46 and 47 of a particulate material respectively.

Figure 10:
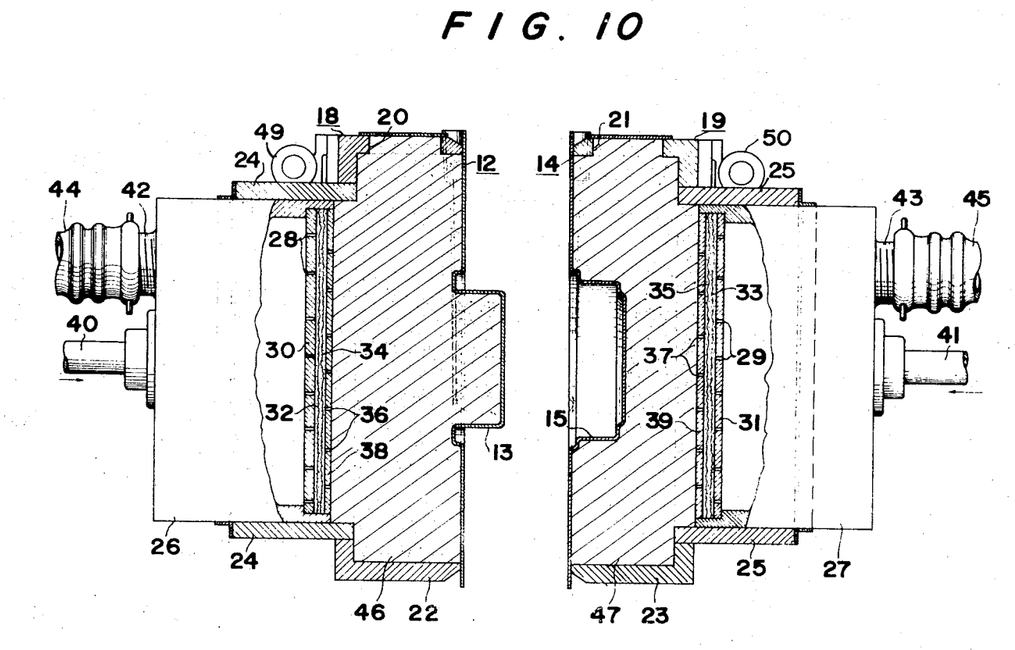
FIG. 10 is a central vertical sectional view of the mold assembly of FIG. 9 from which the pair of patterns is removed.

Accordingly, materials 46 and 47 in flask portions 22 and 23 are pressed by external air pressure through shielding mold members 12 and 14 respectively, so that relative movements of the particles of materials 46 and 47 are precluded. At this time, patterns 4 and 8 are removed from the mold assembly. Shielding mold members 12 and 14 are maintained, as shown in FIG. 10, in their original shapes by materials 46 and 47 as shown at 13 and 15 respectively even after patterns 4 and 8 are removed.

Figure 11:
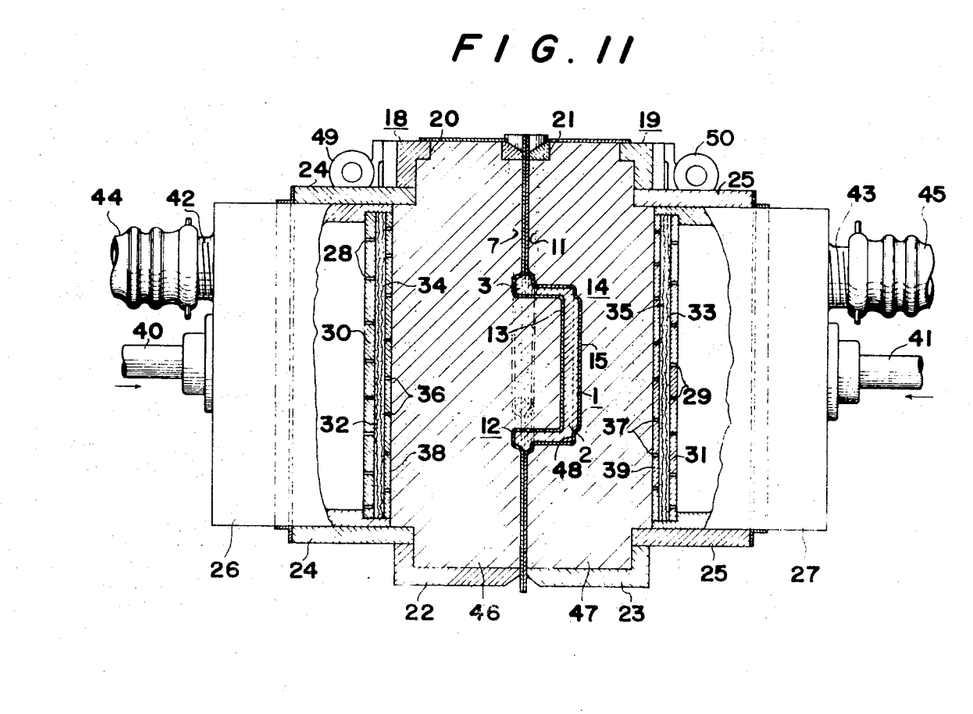
FIG. 11 is a central vertical sectional view of the mold assembly of FIG. 10 shown with a cavity being formed therein.

Thereafter, flasks 18 and 19 are moved toward and connected to each other as shown in FIG. 11, so that a cavity 48 of the same shape as article 1 and a molten metal passageway or sprue are formed between shielding mold members 12 and 14.

Molten metal is poured through said passageway into cavity 48 to produce article 1 by molding.

When the molten metal is poured into the cavity, shielding mold members 12 and 14 melt. However, since they are pushed toward materials 46 and 47 in frame members 22 and 23 respectively by external air pressure, molten shielding mold members 12 and 14 adhere to materials 46 and 47 respectively so as to maintain materials 46 and 47 in a state in which they are cut off from communication with outside. At the same time, the molten metal introduced into cavity 48 maintains insides of flask portions 22 and 23 in a state in which they are cut off from communication with outside, thereby precluding a reduction in vacuum in flask portions 22 and 23. Accordingly, relative movements of the particles of materials 46 and 47 in flask portions 22 and 23 are still precluded, and shielding mold members 12 and 14 are maintained in their original shapes, so that it is possible to produce article 1 of interest by molding.

If the molten metal is allowed to remain in the cavity for several minutes, it will cool off and solidify. Then, the pressure in flask portions 22 and 23 is made equal to atmosphere by supplying air thereinto, and two flasks 18 and 19 are moved apart from each other. This results in article 1 in cavity 48 being released therefrom and moving downwardly. At the same time, materials 46 and 47 in flask portions 22 and 23 are broken to pieces.

Vibrators 49 and 50 may be mounted on flasks 18 and 19 respectively as shown in FIGS. 8 to 11 and actuated when materials 46 and 47 are filled in flask portions 22 and 23, so that the particulate materials may be shaken vigorously and packed tightly. If this is the case, presses 26 and 27 may be done without.

Figure 12:
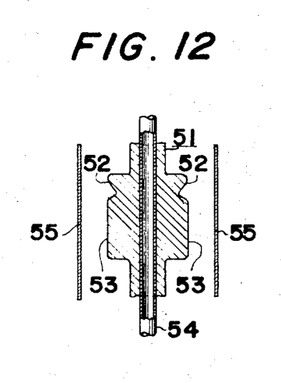
FIG. 12 to FIG. 16 are sectional views of a mold assembly comprising another embodiment of this invention and shown in various different steps.

Another embodiment of this invention will now be explained with reference to FIG. 12 to FIG. 18. In FIG. 12, 51 is a pattern made of wood, plaster of Paris, synthetic resin or metal and having a surface 53 conforming to a shape 52 of an article to be molded. Inserted in pattern 51 is a vent pipe 54 which is maintained in communication with surface 53 through a number of communication openings (not shown).

A coat of synthetic resin is formed in film or sheet form on the surface 53 of pattern 51 by vaporization in vacuum while heating to provide, on the surface pattern 51, a shielding mold member 55 of the same shape as the shape of the article to be produced.

Figure 13:
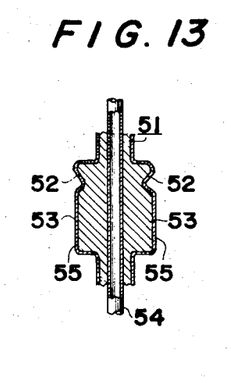

Then, flasks 56 are brought into contact with surface 53 with each flask 56 being juxtaposed to one of the opposite sides of the mold assembly.

Each flask 56 is formed in an upper portion thereof with a supply port 57 for a charge of a material and in its back surface with a vent port 58 provided with a screen filter 59.

Figure 17:
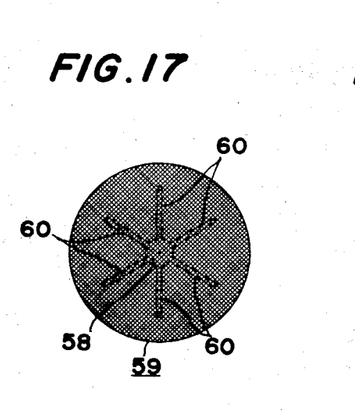
FIG. 17 is an enlarged view of an air vent portion of the flask of the second embodiment.
Figure 18:
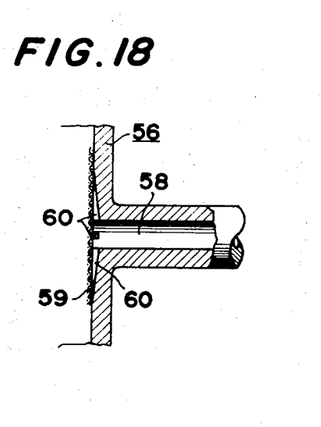
FIG. 18 is a sectional view of FIG. 17.

Radially directed grooves 60 are formed on each flask 56 in a region near vent port 58 so as to increase the area of vent port 58 and preclude deflection of filter 59 as shown in FIGS. 17 and 18.

Figure 14:
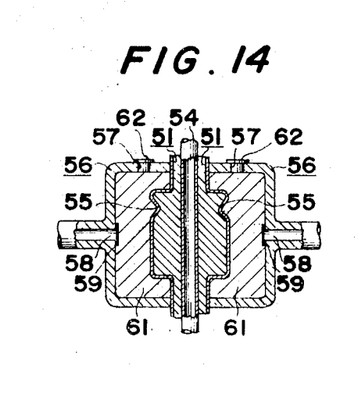

A heat resisting particulate material 61, such as molding sand, is filled in each flask 56 by blowing or pouring through supply port 57, which is then closed by a cover 62 and each flask 56 is evacuated through its vent port 58 so as to render pressure in each flask 56 negative. As a result, shielding mold member 55 is caused by external air pressure to press against flask 56.

Cover 62 may be done without, and shielding mold member 55 may be formed at its upper end with an extension which may be folded to provide cover to supply ports 57.

At this time, no change is caused in the volume of flasks 56 because the particulate material 61 is filled therein. Pressure is applied to material 61 by external air through shielding mold member 55 so that relative movements of the particles of material 61 are precluded.

Figure 15:
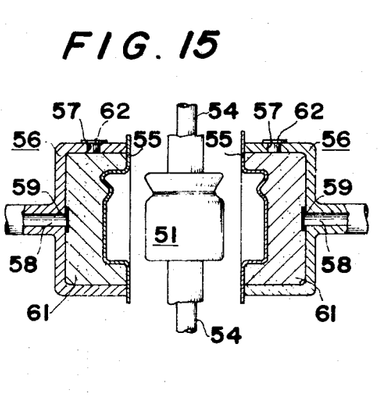

Accordingly, shielding mold member 55 adheres to material 61 and is maintained in the same shape as the surface 53 of patterns 51 or the shape 52 of the article to be molded even after flasks 56 are moved apart from patterns 51.

Figure 16:
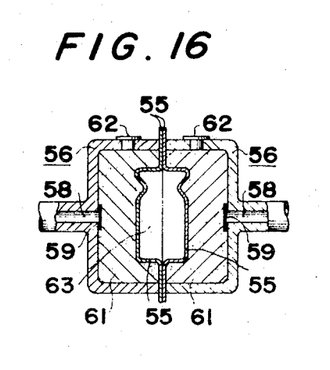

The two flasks 56 are brought into contact with each other again after patterns 51 is removed as shown in FIG. 16 to form a cavity 63 defined by shielding mold members 55. A molten metal is poured in cavity 63 to produce an article of interest by molding.

Another embodiment of this invention will be described with reference to FIG. 19 to FIG. 22. 71 is a flask open at its top at 75 and formed at its bottom with a vent port 72 provided with a screen filter 73.

Figure 19:
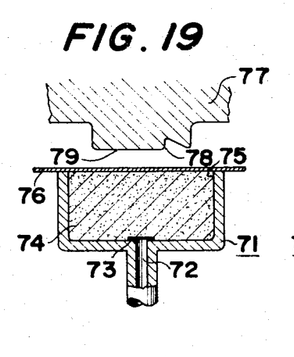
FIG. 19 to FIG. 22 are sectional views of a mold assembly comprising another embodiment of this invention shown in various different steps.
Figure 20:
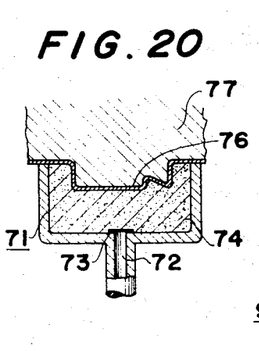

A heat resisting particulate material 74, such as molding sand, is filled in flask 71 through opening 75 at its top and the opening is covered with a soft thin sheet 76 of synthetic resin. 77 is an patterns formed on its surface with a surface 79 conforming to a shape 78 of an article to be molded.

In operation, flask 71 and patterns 77 are disposed such that the surface 79 of the latter is juxtaposed to the opening 75 of the former as shown in FIG. 19, and pattern 77 is caused to press against the soft thin sheet 76 to form the latter into a shielding mold member of the same shape as the surface 79 of pattern 77. Then, flask 71 is evacuated to render pressure in flask 71 negative.

Figure 21:
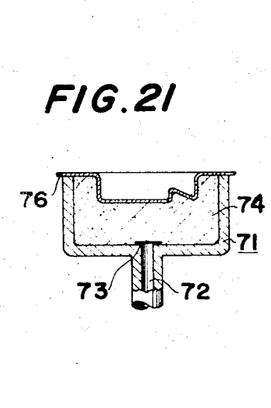

If pattern 77 is moved away from flask 71, then shielding mold member 76 is pressed against material 74 by external air pressure, and relative movements of the particles of material 74 are precluded. Thus, shielding mold member 76 adheres to material 74 and is maintained in the same shape as the surface 79 of pattern 77 or the shape 78 of the article to be molded.

Figure 22:
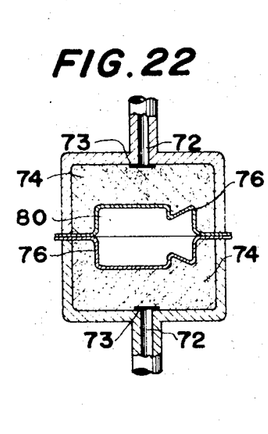

Two flasks 71 each having shielding mold member 76 adhered to the material 74 therein and maintained in the same shape as the shape of the article to be molded are brought into contact with each other as shown in FIG. 22 to form a cavity 80 defined by shielding mold members 76. A molten metal is poured in cavity 80 to produce the article of interest by molding.

Figure 23:
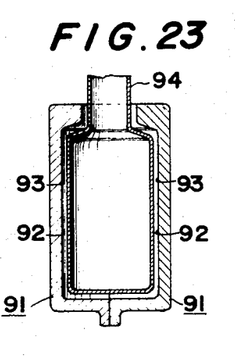
FIG. 23 to FIG. 26 are sectional views of a mold assembly in various steps in which the shielding mold member is disposed inside the pattern.

A still another embodiment of this invention will be explained with reference to FIGS. 23 to 26. In this embodiment, a shielding mold member is disposed inside a pattern, not outside thereof as is the case with the two embodiments described above. In FIG. 23, 91 is a pair of patterns which is formed on an inner surface thereof with a surface 93 conforming to a shape 92 of an article to be molded.

Figure 24:
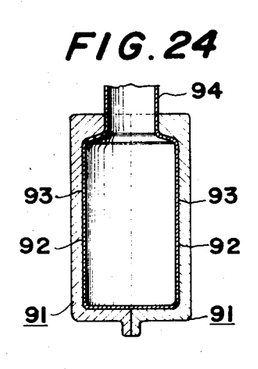

A thin sheet or film of synthetic resin in bag form is inserted in the interior of a pair of patterns 91 and drawn by suction while heating so as to form the sheet into a shielding mold member 94 of the same shape as the shape 92 of the article to be molded as shown in FIG. 24 by vacuum forming.

Figure 25:
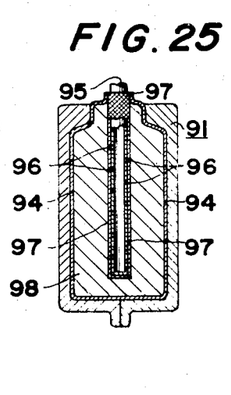

Then, a vent pipe 95 is inserted into the interior of a pattern 91. Vent pipe 95 is formed on its wall with a plurality of openings 96 and covered with a screen filter 97.

Figure 26:
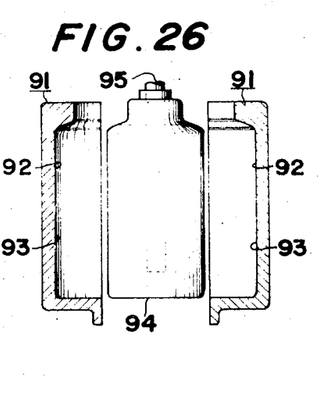

A heat resisting particulate material 98, such as molding sand, is filled in shielding mold member 94 and the interior of shielding mold member 94 is evacuated through pipe 95 to render pressure in shielding mold member 94 negative. As a result, shielding mold member 94 is caused by external air pressure to press against material 98.

At this time, no change is caused in the volume of shielding mold member 94 because it is filled with material 98. Pressure is applied to material 98 by external air through shielding mold member 94, so that relative movements of the particles of material 98 are precluded.

Thus, shielding mold member 94 adheres to material 98 and is maintained in the same shape as the surface 93 of pattern 91 which is of the same shape as the shape 92 of the article to be molded.

In the various embodiments shown and described herein, the shielding mold member may be made of a synthetic resinous material which may be soft or which may have some rigidity depending on the types of articles to be molded. Generally, the use of a shielding mold member of very small thickness is conducive to improved accuracy and precision in molding.

In the various embodiments shown and described hereinabove, the flask may be formed in the same shape as the shape of the article to be molded. This results in a reduction in the space in which the material is filled, thereby permitting to economize on the quantity of material to be filled.

Figure 27:
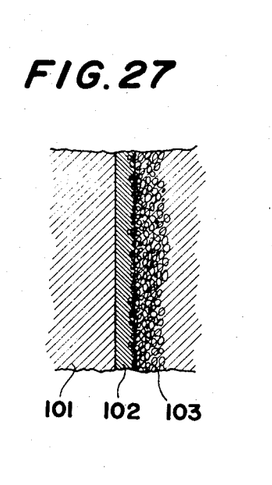
FIG. 27 is an enlarged view of an outer mold member.

If a heated particulate material is filled in flasks or a shielding mold member in the embodiments shown and described above, a portion 103 of the material disposed in the vicinity of shielding mold member 102 in pressing engagement with pattern 101 bites into shielding mold member 102, thereby improving the accuracy of the molded product.

In the various embodiments shown and described hereinabove, shell members may be brought into intimate contact with the surfaces 6 and 10 of patterns 4 and 8 respectively shown in FIG. 7 to shape the shells into shielding mold members 12 and 14 shown in FIGS. 5 and 6. The shielding molds can be maintained in the same shape as a shape of the article to be molded. In this case, it is not needed to give rigidity to the shell itself, so that it is possible to economize on the amount of shell by reducing the thickness of the shell.

Silicone or other mold releasing agent may be applied to the surfaces 6 and 10 of patterns 4 and 8 shown in FIG. 7 before forming shielding mold members 12 and 14 into the same shape as the surface 6 and 10. By this arrangement, shielding mold members 12 and 14 can be readily and quickly formed into the shape of surfaces 6 and 10 of patterns 4 and 8.

A coat of a refractory material, such as graphite, zirconium or aluminum in powder form, for example, may be formed on the side surfaces of shielding mold members. This is conducive to improved skin of a casting.

According to this invention, at least one shielding mold member made as of a thin sheet of synthetic resin is brought into intimate contact with at least one pattern having a portion which conforms to a shape of an article to be molded; a heat resisting particulate material is filled in a space opposite the pattern with respect to the shielding mold member; the pressure of the material is rendered negative so as to draw the shielding mold member by suction toward the material into intimate contact therewith; the pattern is removed to form a cavity defined by the shielding mold member; and a molten metal is poured into the cavity to produce the article of interest by molding. This invention permits to carry out molding readily and quickly as desired. The invention obviates the need to solidify a mold by means of a tacky binder so as to maintain the mold in its original shape by its own rigidity. The invention permits to readily keep the mold in its original shape and remove the molded article from the mold after pouring of a molten metal because the material readily collapses and is broken to pieces for lack of a tacky binder to solidify the same. This is conducive to increased efficiency in a molding operation.

The use of a soft material for making the shielding mold member permits to perform molding readily, thereby increasing efficiency in a molding operation.

The use of a material having suitable rigidity for making the shielding mold member permits to positively keep the shielding mold member in its original shape, thereby increasing the accuracy of molding.

If the shielding mold member is formed by applying a coat of synthetic resin to a surface of the pattern, it is possible to readily and quickly make the shielding mold member, thereby increasing operational efficiency and increasing the accuracy of the molded product.

By forming a thin film or sheet of a synthetic resin by vacuum forming, it is possible to readily and quickly form the thin sheet into a shielding mold member of the same shape as the pattern. This is conducive to greatly reduced operation time for molding.

In performing a molding operation, the material filled in a flask portion of each flask is closely packed by means of a press or a vibrator. This is effective to preclude formation of gaps in the material and prevent deflection of the shielding mold member toward the material when pressure in the flask is rendered negative, so that it is possible to produce an article of accurate dimensions by molding.

We claim:

1. A molding method, comprising:
   forming first and second mold cavities in first and second shielding mold members by steps comprising: bringing a shielding mold member into contact with the surface of a pattern to provide a mold assembly, placing a mold flask adjacent the shielding mold member, filling the space between the flask and the shielding mold member with heat resisting particulate material, reducing the pressure in the space containing said heat resisting particulate material thereby drawing the shielding mold member toward and adhering it to said particulate material, and removing the pattern from the mold assembly leaving a cavity defined by the shielding mold member;
   connecting said first and second shielding members to form a resultant mold cavity;
   and pouring a molten metal into said cavity.

2. The method of claim 1 wherein said shielding mold member comprises synthetic resin material.

3. The method of claim 1 wherein said shielding mold member comprises a thin film of synthetic resin material.

4. The method of claim 1 wherein the step of bringing the shielding mold member into contact with the pattern comprises coating a suitable material on the surface of said pattern to provide said shielding mold member.

5. The method of claim 1 wherein the step of bringing the shielding mold member into contact with the pattern comprises vacuum forming a shielding mold member on the surface of said pattern.

* * * * *